(12) United States Patent
Oh et al.

(10) Patent No.: US 7,273,190 B2
(45) Date of Patent: Sep. 25, 2007

(54) MAGNETIC RECORDING AND REPRODUCING APPARATUS AND METHOD FOR BRAKING A REEL ASSEMBLY

(75) Inventors: Jeong-Hyeob Oh, Anyang-si (KR);
Bong-Joo Kim, Suwon-si (KR);
Jae-Hoon Sim, Suwon-si (KR);
Byeng-Bae Park, Aansan-si (KR);
Seung-Woo Lee, Suwon-si (KR);
Hyeong-Seok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 11/061,523

(22) Filed: Feb. 22, 2005

(65) Prior Publication Data

US 2006/0032964 A1 Feb. 16, 2006

(30) Foreign Application Priority Data

Jun. 18, 2004 (KR) ...................... 10-2004-0045444

(51) Int. Cl.
*G03B 1/04* (2006.01)
(52) U.S. Cl. .................................... 242/355; 242/355.1
(58) Field of Classification Search ................ 242/355, 242/355.1, 334.6, 421.8, 421.9, 422.8; 360/71, 360/85, 93, 95
See application file for complete search history.

(56) References Cited

U.S. PATENT DOCUMENTS

| | | | | |
|---|---|---|---|---|
| 4,917,328 A | * | 4/1990 | Kobayashi et al. | .......... 242/355 |
| 5,099,371 A | * | 3/1992 | Choi | ........................ 242/334.6 |
| 5,620,150 A | * | 4/1997 | Min | ............................ 360/71 |
| 5,639,042 A | * | 6/1997 | Chiu et al. | ................ 242/355.1 |
| 5,669,567 A | * | 9/1997 | Chiu | ........................ 242/355.1 |
| 5,936,793 A | * | 8/1999 | Koh et al. | .................... 360/85 |
| 6,286,775 B1 | * | 9/2001 | Hirabayashi et al. | ..... 242/334.6 |

FOREIGN PATENT DOCUMENTS

| | | | |
|---|---|---|---|
| JP | 53-131010 | * | 11/1978 |
| JP | 57-53860 | * | 3/1982 |
| JP | 07-240044 | | 9/1995 |
| JP | 11-273188 | | 10/1999 |
| JP | 2001-110112 | | 4/2001 |

* cited by examiner

*Primary Examiner*—William A. Rivera
(74) *Attorney, Agent, or Firm*—Roylance, Abrams, Berdo & Goodman, L.L.P.

(57) ABSTRACT

A magnetic recording and reproducing apparatus and a method for braking a reel assembly comprising a lower disc rotatably supported by a stationary shaft located on the deck and an upper disc arranged on the stationary shaft to rotatably coupled to an upper portion of the lower disc. Thus, the upper and lower discs are rotatably coupled to a tape reel of a tape cassette. A disc gear is positioned between the upper and lower discs to receive power from a capstan motor. A friction member is disposed between and in contact with the lower disc.

6 Claims, 6 Drawing Sheets

MAGNETIC RECORDING AND REPRODUCING APPARATUS AND METHOD FOR BRAKING A REEL ASSEMBLY

CROSS-REFERENCE TO RELATED APPLICATIONS

This application claims the benefit under 35 U.S.C. § 119(a) of Korean Patent Application No. 2004-45444, filed Jun. 18, 2004, the entire disclosure of which is hereby incorporated by reference.

BACKGROUND OF THE INVENTION

1. Field of the Invention

The present invention relates to a magnetic recording and reproducing apparatus. More particularly, the present invention relates to a magnetic recording and reproducing apparatus comprising a reel assembly on which a tape cassette is mounted and a method for braking the reel assembly.

2. Description of the Related Art

In general, magnetic recording and reproducing apparatuses such as video cassette tape recorders (VCRs), a camcorder, or the like have a deck mechanism. The deck mechanism is provided to record audio and video information. Moreover, the deck mechanism reproduces audio and video information from a recording medium that moves along a predetermined traveling path, for example, a magnetic tape.

Furthermore, the magnetic recording and reproducing apparatuses described above include a deck on which a head drum is rotatably installed. A pair of reel assemblies are rotatably installed on the deck to drive tape reels of a tape cassette. A tension unit generates a predetermined tension when the tape cassette travels, and a brake unit prevents the reel assemblies from winding or unwinding too far. Reel assemblies are classified into a supply reel assembly to which a tape is supplied and a take-up reel assembly which withdraws tape from the supply reel assembly.

FIG. 1 illustrates a tension unit, a supply reel assembly 25, and a brake unit 30. FIG. 2 is a cross-sectional view of the supply reel assembly 25 shown in FIG. 1.

The tension unit comprises a tension arm 10, tension pole 12, a tension band 20, and an impedance roller (not shown). In FIG. 1, solid lines indicate a state of the tension arm 10 before a magnetic tape (not shown) is loaded. The dotted lines indicate a state of the tension arm 10 after the magnetic tape is loaded. The tension arm 10 is installed adjacent to the supply reel assembly 25. The tension arm 10 pivots on a pivot 13 in a direction indicated by arrow A when the magnetic tape is loaded. In other words, the tension arm 10 is in a position indicated by the solid lines before the magnetic tape is loaded. The tension arm 10 also pivots in the direction of arrow A when the magnetic tape is loaded. Lastly, the tension arm 10 is in a position indicated by the dotted lines after the magnetic tape is loaded. A spring (not shown) is coupled to an end of the tension arm 10 to elastically bias the tension arm 10 in one direction. The tension pole 12 protrudes from an upper surface of an end of the tension arm 10. The tension pole 12 moves in contact with the magnetic tape so that when the magnetic tape is loaded to withdraw the magnetic tape from a tape cassette (not shown). The tension pole 12 pulls the magnetic tape in a direction opposite to a traveling direction of the magnetic tape. Thus, the magnetic tape travels, after the magnetic tape is completely loaded, to apply back tension to the magnetic tape. First and second coupling levers 14, 15 are installed on the tension arm 10. Both ends of the tension band 20 are coupled to the first and second coupling levers 14, 15. Thus, the tension band 20 turns around an outer surface of the supply reel assembly 25. Furthermore, within a predetermined range, the tension is adjusted by the tension arm 10 and moves together with the tension band 20 installed on the supply reel assembly 25.

As shown in FIG. 2, the supply reel assembly 25 comprises a lower disc 27 which is rotatably installed on a stationary shaft 23 coupled to a deck 100. An upper disc 26 is supported by the lower disc 27, and a disc gear 28 is coaxially installed and rotates with the upper disc 26. Tape reels (not shown) of the tape cassette are mounted on the upper disc 26, and the tension band 20 turns around on an outer surface of the disc gear 28.

As described above, the tension arm 10 pivots in the direction of arrow A shown in FIG. 1. Consequently, when the magnetic tape changes from an unloading mode to a loading mode, the tension pole 12 on the tension arm 10 withdraws the magnetic tape from the tape cassette placed on the upper disc 26 and pivots together with the tension arm 10. However, when the tension arm 10 operates rapidly, the magnetic tape is excessively unwound. The brake unit 30 prevents the tension arm 10 from rapidly operating.

The brake unit 30 controls the operation of the supply reel assembly 25 and selectively brakes the rotation of the supply reel assembly 25. The brake unit 30 comprises a first brake 31, a second brake 32, a spring 34, and a torsion spring 33. An end of the first brake 31 contacts and separates from the supply reel assembly 25. The spring 34 elastically presses the first brake 31. Thus, the first brake 31 contacts the supply reel assembly 25. The second brake 32 is coaxially installed with the first brake 31 so as to pivot. The second brake 32 selectively contacts and separates from gear teeth 29 of the disc gear 28 during pivoting. The torsion spring 33 is installed between the first and second brakes 31, 32, respectively. The torsion spring 33 elastically presses the second brake 32. Thus, the second brake 32 contacts the gear teeth 29 of the disc gear 28. During loading operations, the first brake 31 directly presses the tension band 20 and loosely encloses the outer surface of the disc gear 28 of the supply reel assembly 25. Consequently, the tension band 20 contacts the outer surface of the disc gear 28. Thus, the first brake 31 brakes the rotation of the disc gear 28 to prevent the magnetic tape from being excessively unwound due to the rapid operation of the tension arm 10. The second brake 32, during the loading operation or in a stop mode, prevents the magnetic tape from being continuously unwound or wound due to inertia.

However, a drawback of typical magnetic recording and reproducing apparatuses is that the brake unit requires a large number of parts and has a complicated structure. Therefore, the process of manufacturing a magnetic recording and reproducing apparatus is relatively complex. As a result, manufacturing costs for and the size of the magnetic recording and reproducing apparatus increase. These results are contrary to the current trend toward saving manufacturing costs and minimizing the size of magnetic recording and reproducing apparatuses. Accordingly, there is a need for a simplified magnetic recording and reproducing apparatus that increases assembly productivity, lowers manufacturing cost, and minimizes size of the apparatus.

SUMMARY OF THE INVENTION

An aspect of the present invention is to solve at least the above problems and/or disadvantages and to provide at least the advantages described below. Accordingly, an aspect of the present invention is to provide a magnetic recording and reproducing apparatus comprising a reel assembly having a simplified structure to improve assembling productivity, lower manufacturing costs, and minimize the size of the apparatus by reducing a number of parts and a method for braking the reel assembly.

In order to achieve the above-described aspects of the present invention, there is provided a magnetic recording and reproducing apparatus rotatably installed on a deck to drive a tape reel of a tape cassette. A reel assembly is coupled to the tape reel. The reel assembly is configured to contact with the deck to generate a predetermined frictional force during rotation so that rapid rotation is prevented.

The reel assembly may further comprise a lower disc rotatably supported by a stationary shaft located on the deck. An upper disc is arranged on the stationary shaft and rotatably coupled to an upper portion of the lower disc so that each disk rotates together. The upper disc is coupled to the tape reel of the tape cassette. A disc gear is positioned between the upper and lower discs to receive power from a capstan motor. The disc gear is rotatably positioned on the deck. A friction member is disposed between and in contact with the lower disc.

It is preferable that the upper disc is arranged at a predetermined distance from an upper end of the stationary shaft.

It is preferable that the friction member is a washer which is disposed on a bottom of the stationary shaft. The stationary shaft is located on the deck.

According to another aspect of the present invention, there is provided a method for braking a reel assembly of a magnetic recording and reproducing apparatus for preventing a magnetic tape of a tape cassette mounted on the reel assembly from being unwound when the magnetic tape is loaded. The reel assembly comprises a lower disc rotatably installed on a deck. The reel assembly further comprises an upper disc rotatably coupled to an upper portion of the lower disc so that each disk rotates together. The upper disc is coupled to a tape reel of the tape cassette. The method comprises the steps of withdrawing and transferring magnetic tape. Next, the reel assembly is rotated due to the transfer of the magnetic tape and the reel assembly brakes simultaneously with the rotation of the reel assembly. The reel assembly brakes by an internal friction force generated during the rotation of the reel assembly.

It is also preferable that rotating the reel assembly comprises rotating the upper disc due to magnetic tape transfer and rotating the lower disc is due to the rotation of the upper disc. Consequently, the reel assembly brakes by contact with the friction member disposed between the lower disc and the deck during the rotation of the lower disc.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

The above and other objects, and features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for conciseness.

Figure 1:
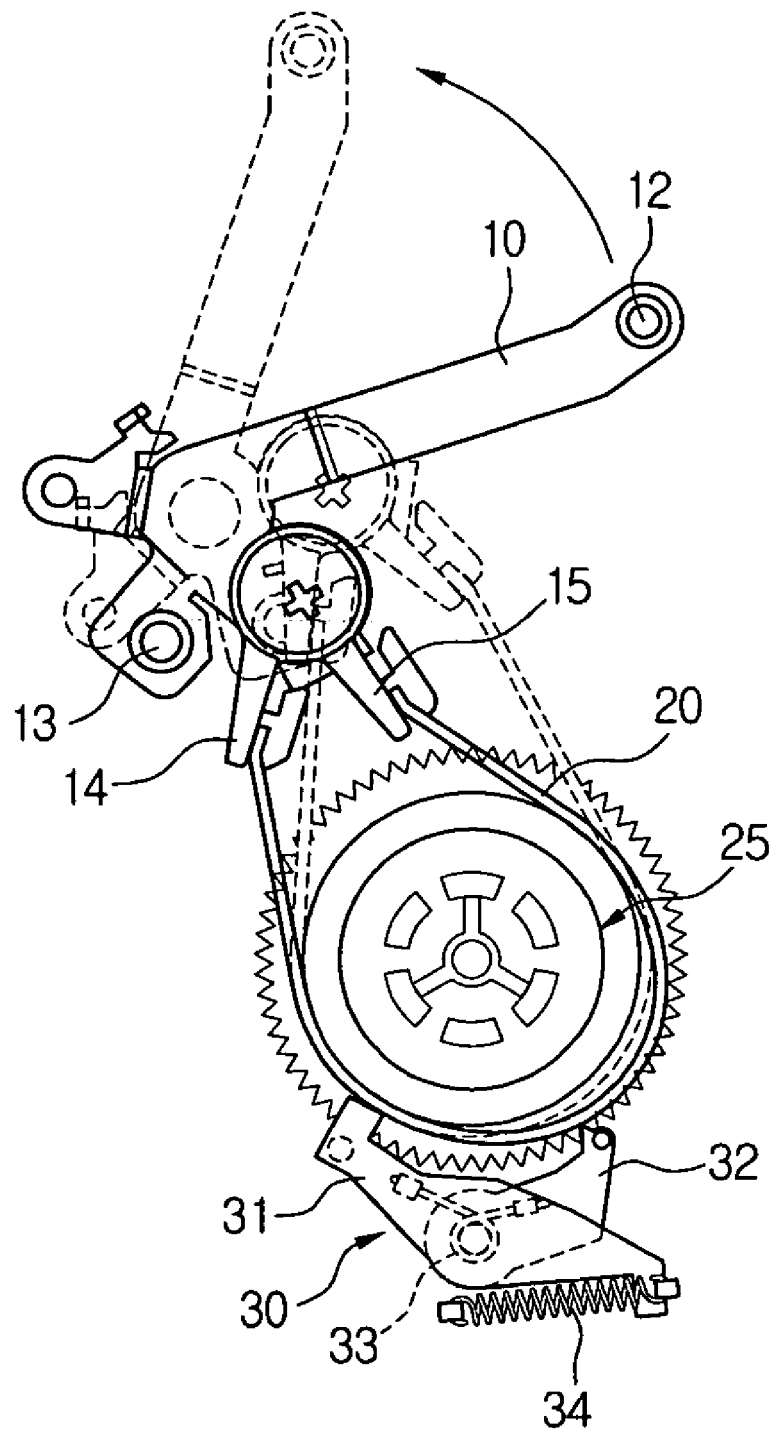
FIG. 1 is a plan view illustrating the main parts of a conventional magnetic recording and reproducing apparatus.
Figure 2:
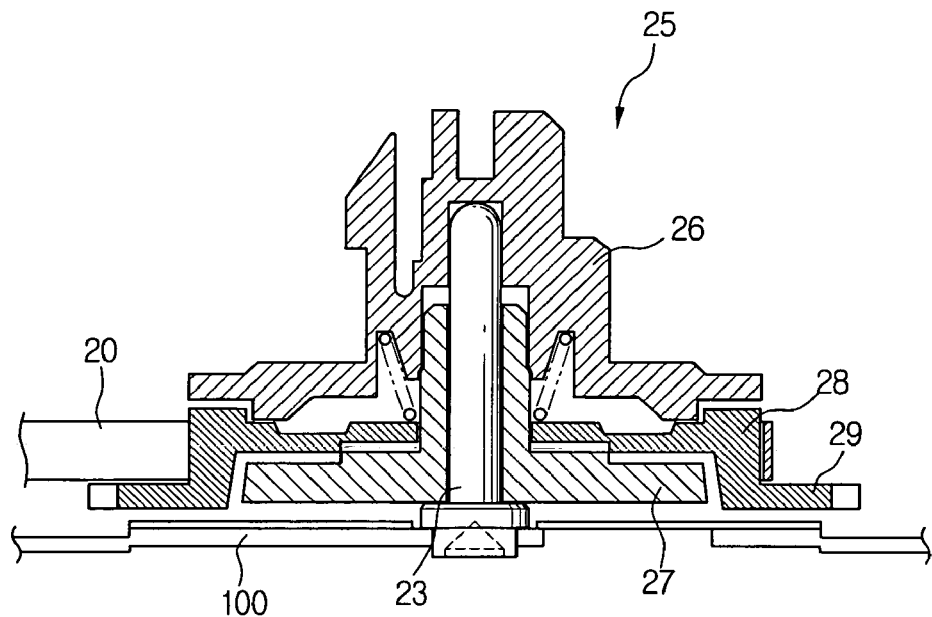
FIG. 2 is a cross-sectional view of a supply reel assembly of the apparatus shown in FIG. 1.
Figure 3:
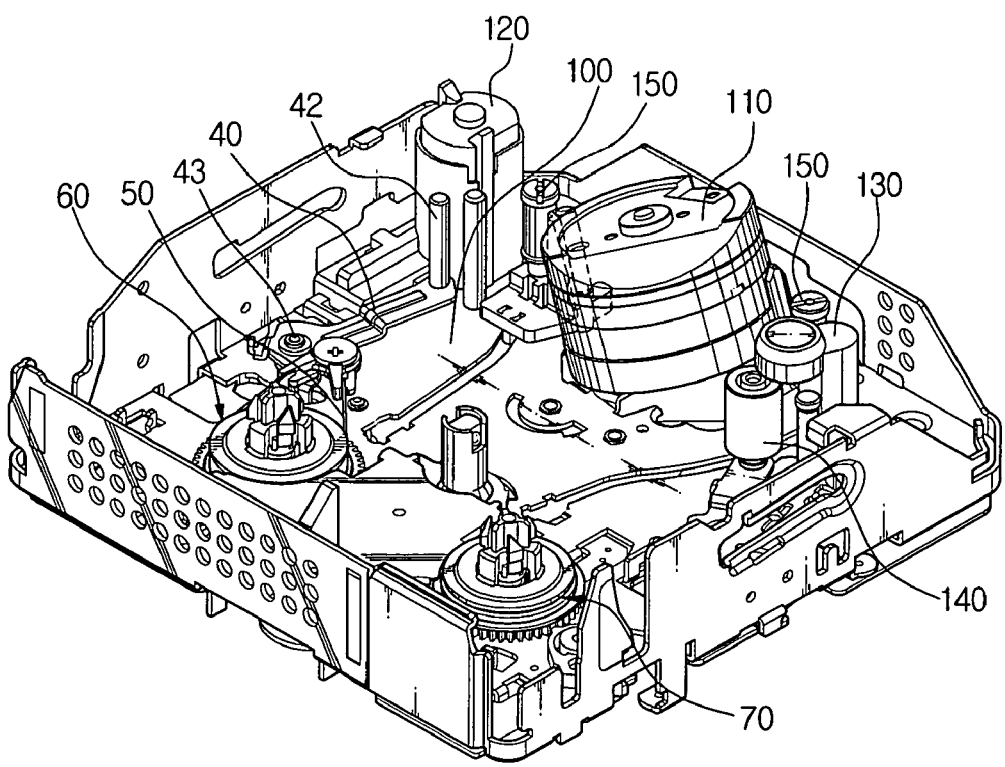
FIG. 3 is a schematic perspective view of a magnetic recording and reproducing apparatus in accordance with an embodiment of the present invention.
Figure 4:
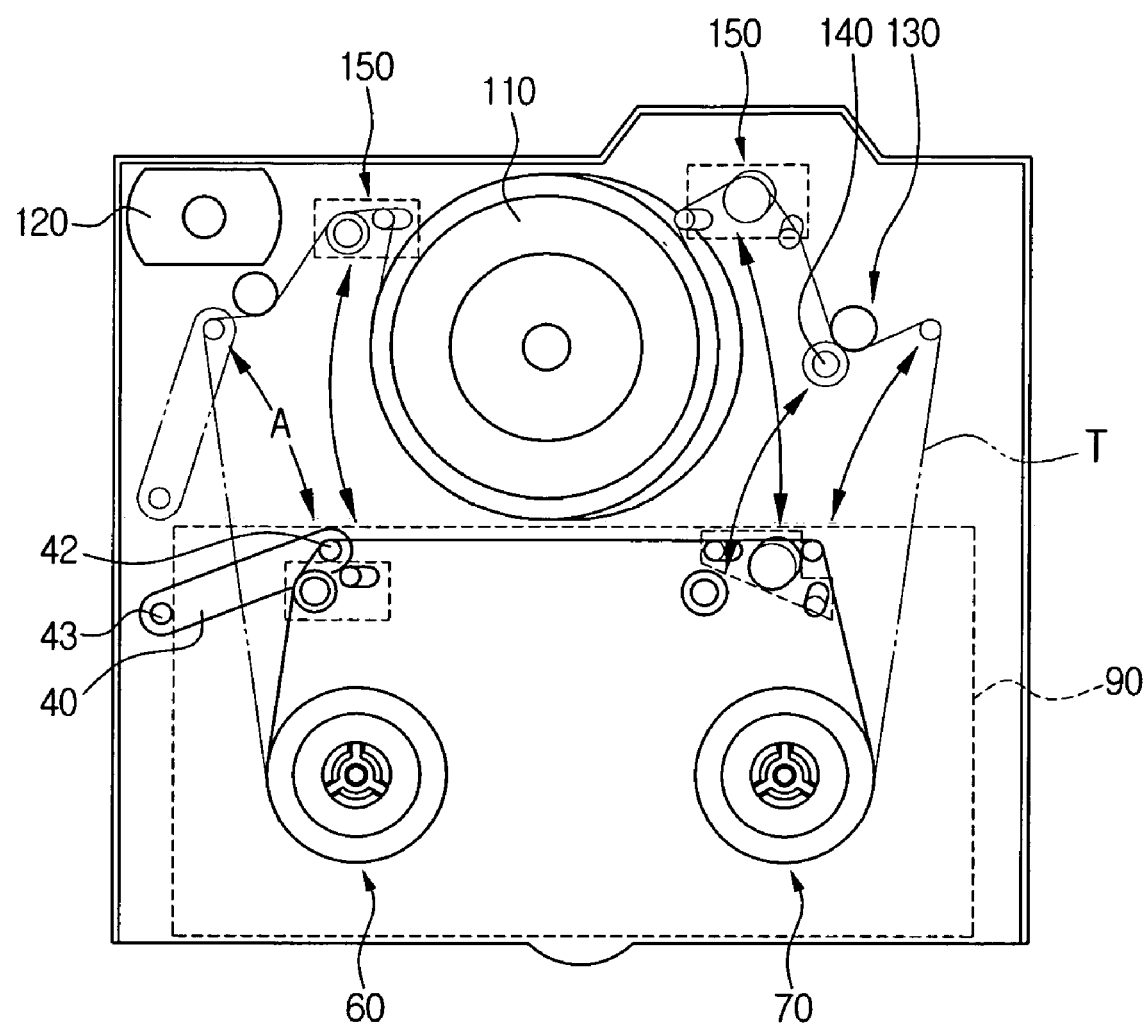
FIG. 4 is a plan view of the magnetic recording and reproducing apparatus in which a tape cassette is mounted.

FIG. 3 is a schematic perspective view of a magnetic recording and reproducing apparatus in accordance with an embodiment of the present invention. FIG. 4 is a schematic plan view of the magnetic recording and reproducing apparatus in which a tape cassette 90 is mounted. As shown in FIG. 3, a head drum 110, a loading motor 120, a capstan motor 130, a pole base loading unit 150, a pinch roller unit 140, a pair of reel assemblies 60, 70, and a tension unit are mounted on a deck 100.

The head drum 110 spins to record information on and reproduces information from a magnetic tape T traveling in contact with an outer surface thereof. The pole base loading unit 150 withdraws the magnetic tape T from a tape cassette 90 during loading so that the magnetic tape T travels in contact with the head drum 110. The pinch roller unit 140 contacts the magnetic tape T being withdrawn from the tape cassette 90 to force the magnetic tape T to contact a shaft of the capstan motor 130. The capstan motor 130 powers the pair of reel assemblies 60, 70 for rotation. The shaft of the capstan motor 130 is preferably uprightly installed on the deck 100 to guide the traveling magnetic tape T. The loading motor 120 drives a main gear (not shown) to power several components comprising the pole base loading unit 150, the pinch roller unit 140, and the like for movement. Tape reels of the tape cassette 90 are coupled to the pair of reel assemblies 60, 70, respectively. Herein, the reel assembly 60 is called a supply reel assembly to supply the magnetic tape T. The reel assembly 70 is called a take-up reel assembly 70 to wind the magnetic tape T. The take-up reel assembly 70 is not related to the principle points of the exemplary embodiments of the present invention. Therefore, only the supply reel assembly 60 will be described herein in detail. Unless stated otherwise, a reel assembly refers to the supply reel assembly 60.

The tension unit is located proximate the supply reel assembly 60. The supply reel assembly 60 withdraws magnetic tape T from the tape cassette 90 during loading of the magnetic tape T. Thus, the magnetic tape T is rotates around the border of the deck 100 to apply a predetermined tension to the traveling magnetic tape T. The tension unit comprises a tension arm 40 installed on the deck 100 so as to pivot on a pivot 43. A tension pole 42 is installed on an end of the tension arm 40 and a tension band 50 turns around an outer surface of the reel assembly 60.

Figure 5:
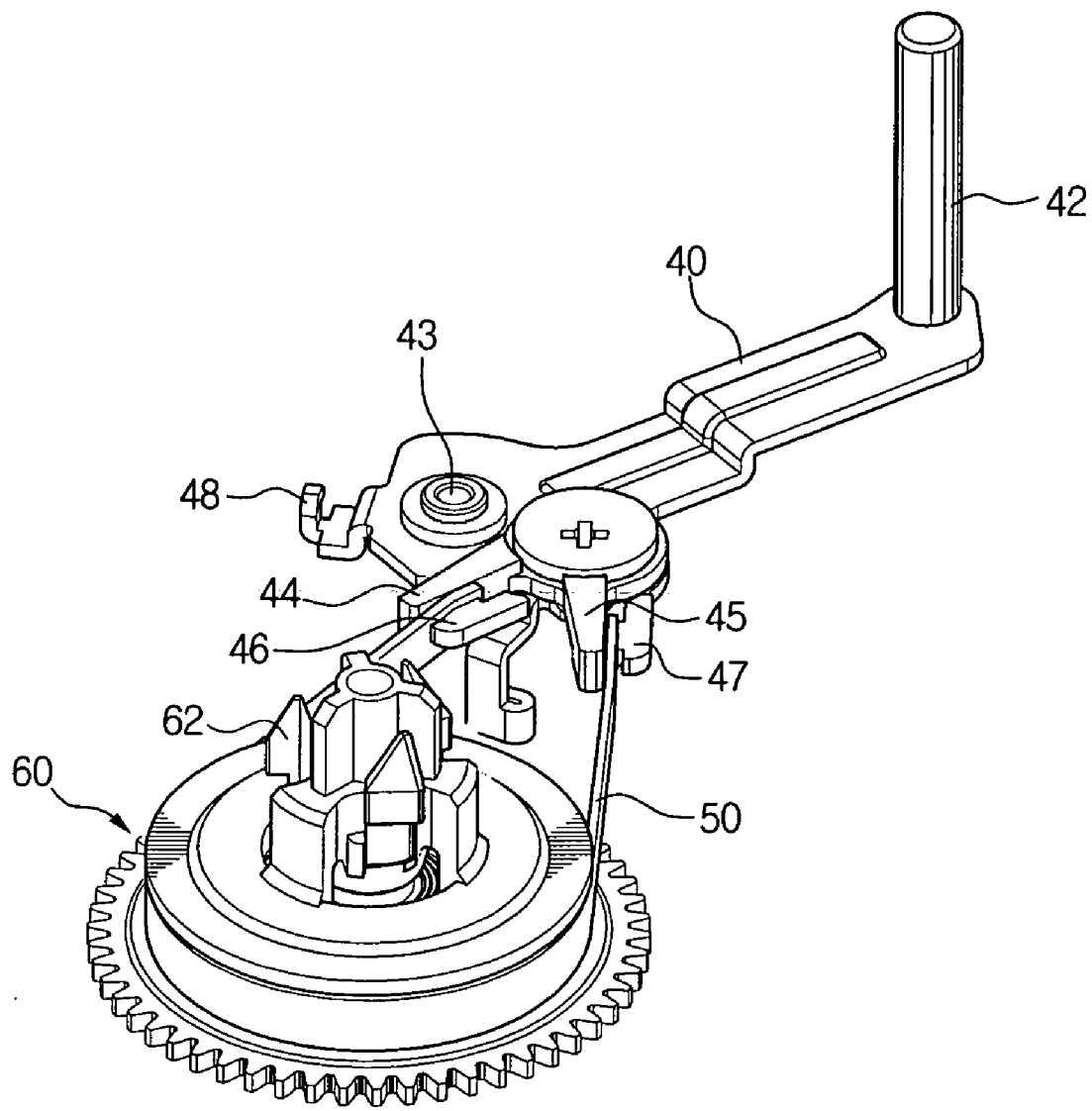
FIG. 5 is a perspective view illustrating a reel assembly and a tension unit of the apparatus shown in FIG. 3.
Figure 6:
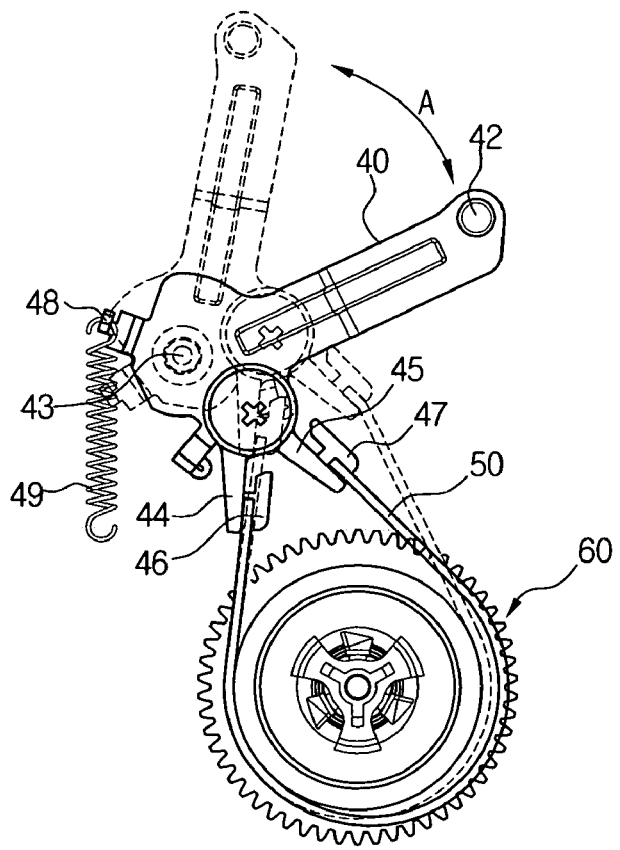
FIG. 6 is a plan view illustrating the reel assembly and the tension unit before and after a tape cassette is loaded.

FIG. 5 is a perspective view illustrating the reel assembly 60 and the tension unit shown in FIG. 3. FIG. 6 is a plan view illustrating the reel assembly 60 and the tension unit before and after the magnetic tape T is loaded.

The tension arm 40 pivots on the pivot 43 of the deck 100 as shown in FIG. 3. The tension pole 42 is preferably uprightly installed on an upper surface of the end of the tension arm 40. The tension pole 42 pivots in contact with the magnetic tape T of the tape cassette 90 of FIG. 4. The tension arm 40 is mounted on an upper disc 62 of the reel assembly 60 during loading of the magnetic tape T to withdraw the magnetic tape T from the tape cassette 90. A suspension protrusion 48 is preferably formed at an end of the tension arm 40 and coupled to a spring 49 to elastically bias the tension arm 40 in one direction. First and second coupling levers 44, 45 are installed on the tension arm 40 and comprise first and second hooks 46, 47, respectively. Both ends of the tension band 50 are coupled to the first and second hooks 46, 47, respectively, so that the tension band 50 turns around the outer surface of the reel assembly 60.

The operation of the tension unit will now be described with reference to FIGS. 4-6. The solid lines indicate the tension arm 40 before the magnetic tape T is loaded and the dotted lines indicate the tension arm 40 after the tape cassette 90 is mounted on the upper disc 62 of the reel assembly 60. The tension arm 40 pivots in the direction of arrow A when the magnetic tape T is loaded. However, after the magnetic tape T is loaded, the tension arm 40 pivots toward a position indicated by the dotted lines. That is, toward the loading motor 120 as shown in FIG. 4. Also, after the magnetic tape T is loaded, the tension arm 40 adjusts the magnetic tape T to apply a predetermined tension to the traveling magnetic tape T in each mode. The tension pole 42 withdraws the magnetic tape T from the tape cassette 90 during loading to guide the magnetic tape T. The tension pole 42 also applies tension to pull the magnetic tape T in an opposite direction to a traveling direction of the magnetic tape T. As shown in FIG. 6, the tension band 50 is loosely wound around the reel assembly 60 as marked with the solid lines. Thus, the magnetic tape T is unloaded but tightened on the reel assembly 60. When the magnetic tape T travels as marked with the dotted lines to press the outer surface of the reel assembly 60 braking of the reel assembly 60 rotation occurs.

Figure 7:
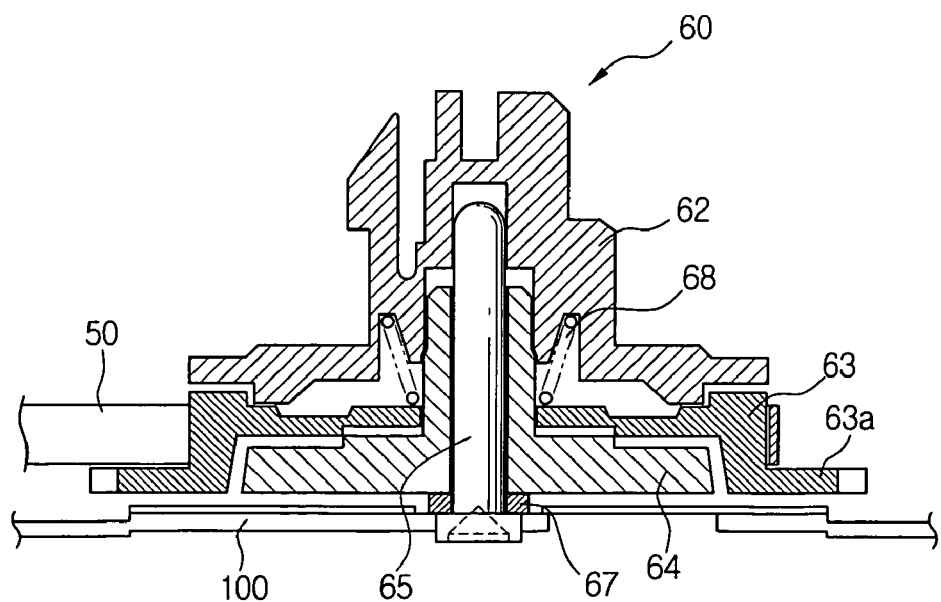
FIG. 7 is a cross-sectional view of the reel assembly shown in FIG. 5, according to an embodiment of the present invention.

FIG. 7 is a cross-sectional view of the reel assembly 60. The reel assembly 60 is rotatably coupled to a tape reel of the tape cassette 90 (FIG. 4) to rotate the tape reel in a traveling mode. The reel assembly 60 is installed on the deck 100. The reel assembly 60 is preferably driven by a predetermined drive source such as a capstan motor 130 (FIG. 3). Tension band 50 is coupled to the tension arm 40 (FIG. 6) and is wound around the outer surface of the reel assembly 60 to selectively contact and separate from the reel assembly 60. The tension band 50 is tightened or loosened depending on the pivoting state of the tension arm 40. In the traveling mode, after the magnetic tape T is loaded, the tension band 50 contacts and separates from the outer surface of the reel assembly 60 to brake the reel assembly 60.

As shown in FIG. 7, the reel assembly 60 comprises the upper disc 62, a lower disc 64, a disc gear 63, a clutch spring 68, and a friction member 67.

The lower disc 64 is rotatably coupled around stationary shaft 65. Stationary shaft 65 is preferably fixed to the deck 100.

The upper disc 62 is arranged on an upper portion of the lower disc 64 so as to rotate together with the lower disc 64. The upper disc 62 is arranged around the stationary shaft 65. Preferably, in a manner that is similar to lower disc 64. A protrusion is formed on the upper disc 62. The protrusion is preferably shaped to receive the tape reel of the tape cassette 90. The upper disc 62 is arranged at a predetermined distance from an upper end of the stationary shaft 65. This spacing arrangement preferably reduces contact between the upper disc 62 and the stationary shaft 65 to increase an effect of a predetermined frictional force generated by contact between the friction member 67 and the deck 100 during rotation of the reel assembly 60.

The disc gear 63 is positioned between the upper and lower discs 62, 64. The disc gear 63 is preferably substantially ring-shaped and comprises gear teeth 63a. Preferably, the gear teeth 63a are selectively coupled to an idle gear (not shown) to receive power from the capstan motor 130. Thus, the disc gear 63 receives power from the capstan motor 130 to rotate only when the disc gear 63 is coupled to the idle gear. The disc gear 63 is preferably coaxially installed together with the upper disc 62 and coupled to and supported by the upper disc 62 via clutch spring 68. Thus, the upper disc 62 rotates when the disc gear 63 rotates. As a result, the lower disc 64 coupled to the upper disc 62 also rotates.

The clutch spring 68 reduces the rotational force of the disc gear 63 and then transmits the rotation force of the disc gear 63 to the upper disc 62.

The friction member 67 is preferably disposed proximate the lower disc 64 of the reel assembly 60 and the deck 100 to contact the lower disc 64 and the deck 100. The friction member 67 generates the predetermined frictional force during the rotation of the reel assembly 60 to brake the rotation of the reel assembly 60. Here, "braking" generally means that the rotation of the reel assembly 60 is not completely stopped but is decelerated. The friction member 67 is preferably a washer which is formed of a resilient material such as rubber. The friction member 67 is coupled to a bottom of the stationary shaft 65 on the deck 100 so as to contact the deck 100. Thus, the friction member 67 contacts the lower disc 64 and generates the predetermined frictional force to decelerate the rotation of the reel assembly 60. Thus, deviation of the magnetic tape T from a normal traveling path during loading is prevented. Therefore, excessive unwinding of the magnetic tape T due to the rapid operation of the tension arm 40 is prevented in the direction of arrow A (FIG. 6). In other words, rotation of the reel assembly 60 decelerates by the predetermined frictional force generated by contact with the friction member 47. As a result, the tension pole 42 and the tension arm 40 guide the magnetic tape T, wound around the upper disc 62 (FIG. 4), and prevent rapid pivoting.

The predetermined frictional force to brake the reel assembly 60 to prevent the tension arm 40 from rapidly pivoting may affect the operation of the reel assembly 60 in another mode after loading. For example, a playback mode or a fast forward mode. Thus, the magnitude of the predetermined frictional force should be suitably designed. For example, it is preferable that the power from the capstan motor 130 driving the reel assembly 60 is increased, and run time is slowed down during the loading operation, or pivoting of the tension arm 40 decelerates so as to increase a rotational force of the reel assembly 60. The friction member 67 generates the predetermined frictional force during rotating of the reel assembly 60. Thus, the friction member 67 is disposed between the lower disc 64 and the deck 100 to contact the lower disc 64 and the deck 100, and the position and size thereof are not limited.

Figure 8:
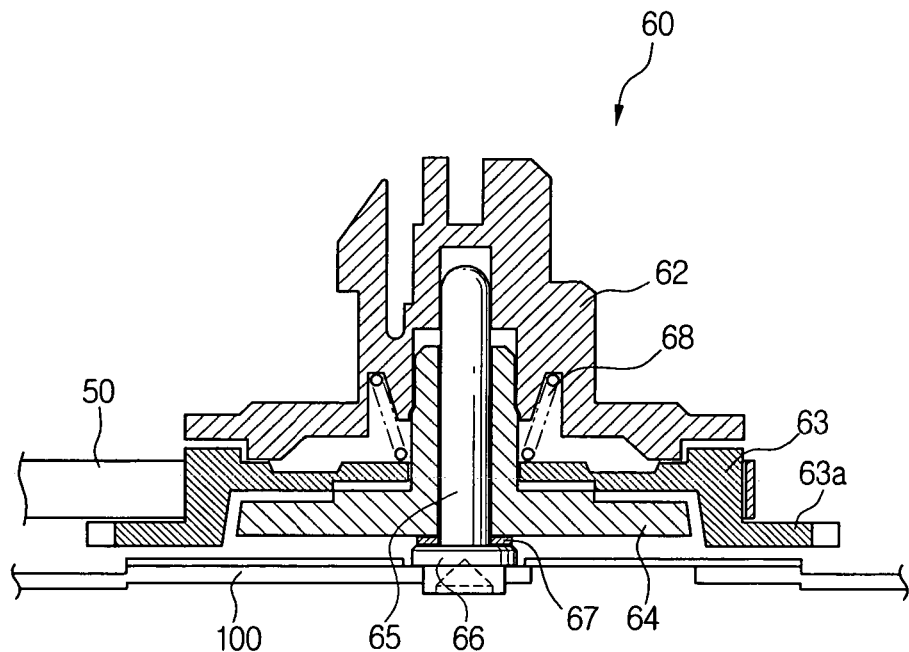
FIG. 8 is a cross-sectional view of a reel assembly, according to another embodiment of the present invention.
Figure 9:
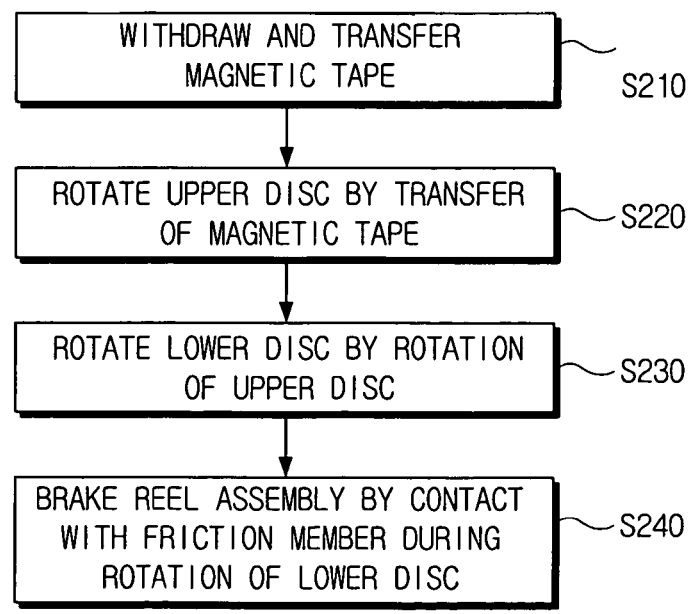
FIG. 9 is a flowchart for a method of braking a reel assembly, according to an embodiment of the present invention.

FIG. 8 is a cross-sectional view of the reel assembly 60 in accordance with another embodiment of the present invention. In the present embodiment, the friction member 67 is disposed between a lower support 66 of the stationary shaft 65 and the lower disc 64. In other words, unlike in the previous embodiment, the friction member 67 does not contact the deck 100 but preferably contacts the lower support 66 of the stationary shaft 65. However, in the present embodiment, the stationary shaft 65 is fixed to the deck 100 and the lower support 66 contacts the deck 100. Therefore, the friction member 67 produces a similar result as that of the previous embodiment.

The operation of the reel assembly 60 during the loading operation and a method for braking the reel assembly 60 according to an embodiment of the present invention will now be described with reference to FIGS. 3-8.

When the tape cassette 90 is loaded on the reel assembly 60, the pole base loading unit 150 transfers the head drum 110 so that the magnetic tape T withdrawn from the tape cassette 90 to contact the head drum 110. At the same time, the tension arm 40 pivots toward the loading motor 12 as shown in FIG. 4. Here, the tension pole 42 withdraws magnetic tape T from the tape cassette 90, in contact with the magnetic tape T, to guide the magnetic tape T. The tension pole 42 moves together with the tension arm 40 in the direction of arrow A.

In step S210, the magnetic tape T is transferred by pivoting the tension arm 40 and the tension pole 42. In step S220, the tape reels of the tape cassette 90 are placed on the upper disc 62 of the reel assembly 60 and rotate due to transfer of the magnetic tape T. Thus, the upper disc 62 is rotated. In step S230, the lower disc 64 is preferably rotatably coupled to the upper disc 62. In step S240, the friction member 67 is disposed between the lower disc 64 and the deck 100. More specifically, the lower disc 64 rotates in contact with the friction member 67, and the friction member 67 generates the predetermined frictional force during its rotation.

Accordingly, since the reel assembly 60 is prevented from rapidly rotating due to the rapid pivoting of the tension arm 40, the magnetic tape T of the tape cassette 90 is prevented from being excessively unwound.

As described above, in a magnetic recording and reproducing apparatus and a method for braking a reel assembly 60, in accordance with an embodiment of the present invention, a friction member 67 may be installed on a reel assembly 60 so as to contact a deck 100. Thus, the reel assembly 60 may be prevented from rapidly rotating due to the rapid operation of a tension arm 40. As a result, magnetic tape T may be prevented from being excessively unwound.

Accordingly, a number of parts for an additional brake to prevent the rapid rotation of the reel assembly may be reduced. Thus, the manufacturing process for the magnetic recording and reproducing apparatus may be simplified. Moreover, manufacturing costs for the magnetic recording and reproducing apparatus may be saved. Lastly, the additional brake may be removed to minimize the space of the magnetic recording and reproducing apparatus. As a result, the magnetic recording and reproducing apparatus may be minimized.

While the invention has been shown and described with reference to certain embodiments thereof, it will be understood by those skilled in the art that various changes in form and details may be made therein without departing from the spirit and scope of the invention as defined by the appended claims.

What is claimed is:

1. A magnetic recording and reproducing apparatus rotatably installed on a deck to drive a tape reel of a tape cassette, comprising:
 a reel assembly coupled to the tape reel; and
 a friction member disposed between and contacting the reel assembly and the deck to generate a predetermined frictional force during rotation so that rapid rotation of the reel assembly is prevented;
 wherein the reel assembly comprises:
 a lower disc rotatably supported by a stationary shaft located on the deck, the friction member being disposed between the lower disc and the deck;
 an upper disc arranged on the stationary shaft and rotatably coupled to an upper portion of the lower disc so that each disk rotates together; and
 a disc gear positioned between the upper and lower discs to receive power from a driving source, the disc gear being rotatably positioned on the deck;
 wherein the friction member is a washer disposed proximate a bottom of the stationary shaft; and
 wherein the washer comprises rubber.

2. The magnetic recording and reproducing apparatus of claim 1, wherein
 the upper disc is arranged at a predetermined distance from an upper end of the stationary shaft.

3. The magnetic recording and reproducing apparatus of claim 1, further comprising a clutch spring disposed between the disc gear and the upper disc for transmitting rotational force of the disc gear to the upper disc.

4. A magnetic recording and reproducing apparatus having a reel assembly rotatably installed on a deck to drive a tape reel of a tape cassette, comprising:
 a stationary shaft located on the deck and being supported by a lower support;
 a lower disc rotatably coupled around the stationary shaft;
 an upper disc arranged on the stationary shaft and rotatably coupled to an upper portion of the lower disc so that each disk rotates together, the upper disc being coupled to the tape reel of the tape cassette;
 a disc gear for receiving power, the disc gear being coaxially installed with the upper disc;
 a friction member disposed between and in contact with the lower disc and the lower support of the stationary shaft to generate a predetermined frictional force during rotation so that rapid rotation of the reel assembly is prevented;
 wherein the friction member is a washer disposed proximate a bottom of the stationary shaft;
 wherein the washer comprises rubber.

5. The magnetic recording and reproducing apparatus of claim 4, wherein
 the upper disc is arranged at a predetermined distance from an upper end of the stationary shaft.

6. The magnetic recording and reproducing apparatus of claim 4, further comprising a clutch spring disposed between the disc gear and the upper disc for transmitting rotational force of the disc gear to the upper disc.

* * * * *